Sept. 20, 1938.  H. G. WATKIN  2,130,657
ELECTRIC WELDING MACHINE
Filed Feb. 26, 1936     3 Sheets-Sheet 1
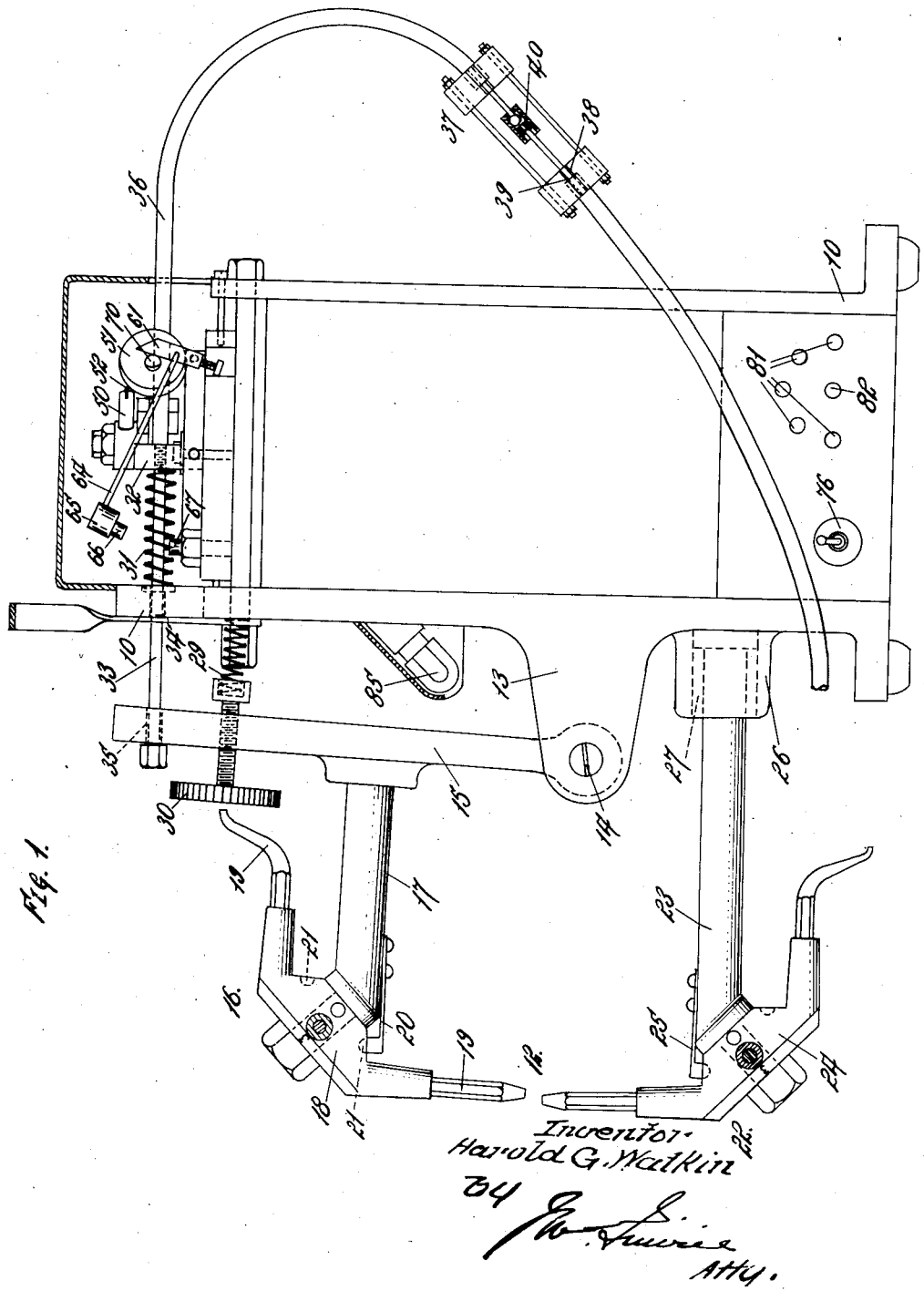

Sept. 20, 1938.  H. G. WATKIN  2,130,657
ELECTRIC WELDING MACHINE
Filed Feb. 26, 1936  3 Sheets-Sheet 2
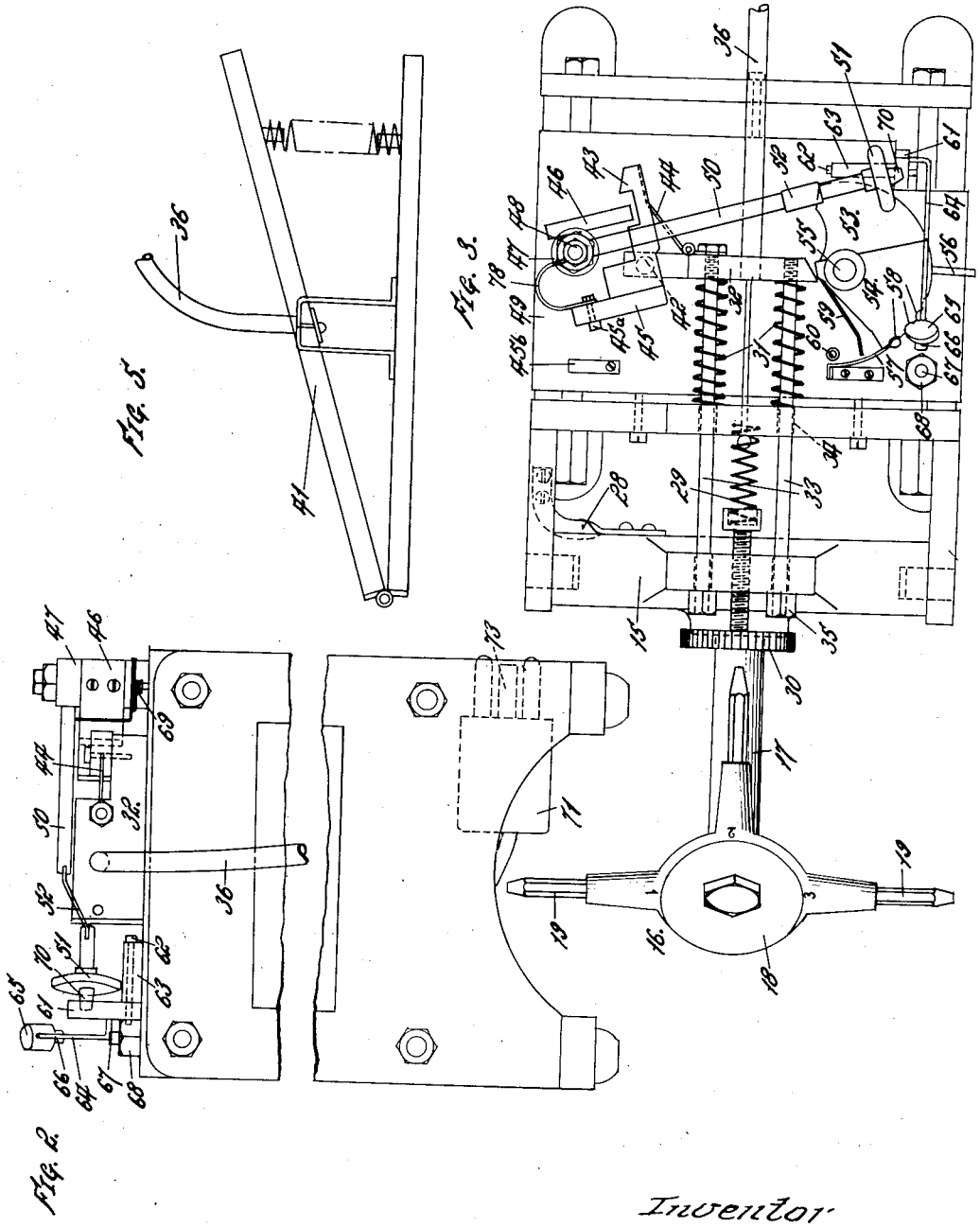
Inventor
Harold G. Watkin
By J. Lurie
Atty

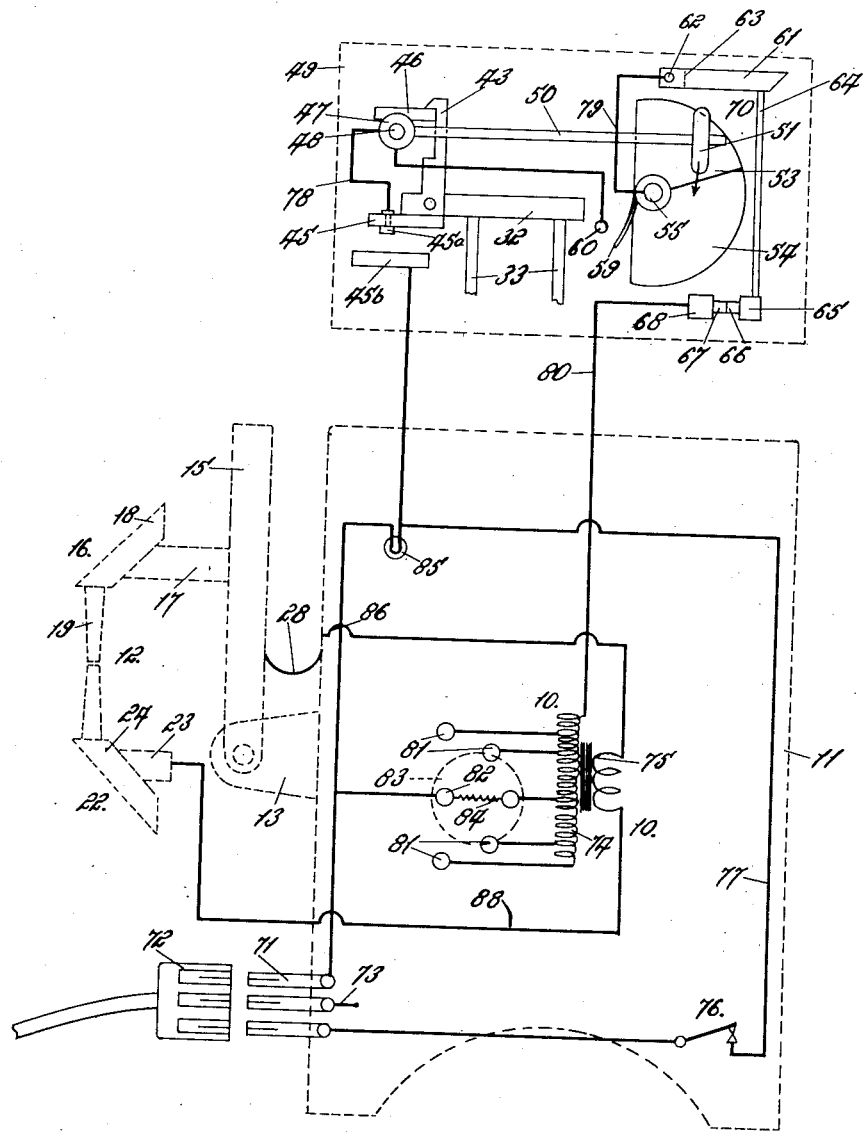

Patented Sept. 20, 1938

2,130,657

UNITED STATES PATENT OFFICE 2,130,657

ELECTRIC WELDING MACHINE

Harold Gladstone Watkin, Liverpool, England

Application February 26, 1936, Serial No. 65,882
In Great Britain March 1, 1935

5 Claims. (Cl. 219—4)

This invention is for improvements in or relating to electric welding machines.

One object of the present invention is to provide a welding machine capable of welding small gauge material which requires delicate adjustment of the time during which the welding current is flowing so as to prevent burning of the work. A further object of the invention is to provide a machine which is readily transportable in a compact form, and a general object is to provide a machine which while being capable of delicate work is at the same time substantially automatic in the control of the welding operation.

According to the present invention there is provided in an electric welding machine having a welding circuit including electrodes for connecting a work piece in the welding circuit, a welding-current-control switch means comprising a time switch including a contactor strip and a brush device, a reaction means, a trip catch, switch closing means, an operative connection between said trip catch and the switch closing means, said trip catch being arranged to engage said brush device and pre-set it to one side of the contactor strip against the action of the reaction means, and subsequently to release said brush device, so that on its return movement under the action of the reaction means it will traverse the contactor strip and close the welding circuit for a predetermined time, and means for maintaining the welding circuit open during pre-setting of the brush by the trip catch.

The term "work piece" is to be taken as including a body or a plurality of bodies.

The term "welding circuit" is used in the specification to include the whole welding circuit between the supply terminals and the welding electrodes (which may comprise the work piece). For example in an A. C. welding machine the term includes the primary and secondary circuits, and further the term is to be construed as including a relay circuit controlling the flow of the welding current.

Conveniently the contactor strip is adjustably mounted so that the length of the path traversed by the brush device and thereby the time of flow of welding current can be varied, means being provided for securing the adjustable contactor strip in any one of a plurality of positions. In the preferred construction the welding machine further comprises a pilot switch having anti-sparking contacts, operatively connected to or associated with the time switch and arranged to break the welding circuit before the brush device has completed its return traverse across the contactor strip.

In one embodiment of the present invention the welding circuit is maintained open during the pre-setting of the brush device by a main switch comprising a fixed contact and a movable contact operatively connected to the trip catch for movement therewith and so arranged that said movable contact does not engage the fixed contact until the trip catch has pre-set the brush device. This arrangement insures that there is no flow of welding current during the pre-setting of the brush device.

In cases where the welding operation on a work piece is effected between electrodes, the electrodes may be mounted for adjustment towards and away from one another and the welding machine may include a manually operated member such as a treadle for controlling the relative movement of said electrodes, an operative connection between said manually operated member and the trip catch being provided and so arranged that movement of the manually operated member in one direction to effect a welding operation causes the trip catch to engage and move the brush device and subsequently to release said brush device.

Preferably two sets of electrodes are mounted on the machine in adjustable turret heads so that any two electrodes can be brought into position for co-operation in the welding operation, and gauge devices are associated with each turret head for properly centering the appropriate electrodes. The axes of the turret heads are arranged at an angle to each other so that the electrodes which are not in use lie behind and clear of the electrodes which are being used for the welding operation, and thereby the idle electrodes cannot interfere with the introduction or removal of the work-piece or with the vision of the operator.

Other features of the invention will be pointed out in the accompanying description which refers to a specific example of the invention as applied to a welding machine suitable for orthodontic work. In the description reference will be made to the accompanying drawings whereon:

Figure 1 is a side elevation of the welding machine,

Figure 2 is a rear elevation of the machine shown in Figure 1,

Figure 3 is a plan view of the machine shown in Figures 1 and 2, and

Figure 4 shows diagrammatically the various electrical connections of the machine.

Figure 5 shows a treadle for operating the welding machine.

The type of welding machine illustrated is one in which a transformer 10 mounted in a frame 11 steps down the voltage of the supply mains and applies current at a correspondingly greater amperage to the work-piece through electrodes 12 arranged in the secondary circuit of the transformer.

The frame 11 is provided with lugs 13 apertured at 14 to form bearings for an upper electrode support 15. The upper electrode 16 is rotatably mounted in a post 17 and the turret member 18 carries a number (e. g., 4) of different electrodes 19 for different classes of work. The axis of rotation of the turret is such that all electrodes not in use for the welding operation are remote from the electrode which is in use. A spring gauge 20 co-operates with notches 21 on the turret to hold the upper electrode in any position of adjustment.

The lower electrode 22 is constructed similarly to the upper electrode, and for this purpose the supporting post 23 has a turret 24 held in any position of adjustment by its corresponding spring gauge 25. The post 23 is secured in a boss 26 formed on the frame 10 and provided with an internal insulating bushing 27. The upper electrode support 15 is provided with the flexible current conductor 28 which serves to short circuit the electrical contact between the support 15 and its bearings. A compression spring 29, located between the frame 10 and the support 15, is arranged to urge the upper electrode into contact with the lower electrode, and the pressure exerted by this spring can be adjusted by the knurled screw 30. The urge of the spring 29 is overcome by two compression springs 31 acting on a yoke 32 which carries two pins 33 passing through guiding apertures 34 in the frame 10 and passing through the support 15 and having abutments 35 which engage the support 15 for the purpose of compressing the welding spring 29.

The movement of the yoke 32 is controlled by a Bowden wire mechanism, the sheath member 36 of which is connected to the yoke and the internal member of which is connected to the frame 10. For convenience in transport the Bowden wire mechanism is interrupted between its ends and preferably close to the welding machine, and the free ends of the Bowden mechanism at this interruption are coupled together for the operation of the yoke by a rigid bridge piece 37 secured to one free end of the sheath member of the Bowden mechanism, and the other end of the bridge piece is slotted at 38 to provide a guide 39 for the internal wire of the free end attached to the treadle 41. Coupling devices 40 are secured to both free ends of the internal wire and these free ends can be coupled together to provide the desired relative movement between the sheath member and the internal wire under the control of the treadle 41.

On a lug 42 formed on the yoke 32 is pivoted a pawl 43 urged by a spring 44 and provided with an insulated extension 45, extending on the opposite side of the pivot from the pawl, which carries a contact 45a, co-operating with a fixed contact 45b.

The contacts 45a, 45b constitute the main switch of the apparatus.

The pawl 43 is arranged to engage, during the movement of the electrodes into the operative position, a block 46 of insulating material attached to a sleeve 47 rotatably mounted on a pillar 48 secured to a base plate 49 of insulating material. The sleeve 47 carries an arm 50 on the end of which is rotatably supported a brush device consisting of a roller 51. A piece of springy material 52 is inserted in the arm 50 so as normally to press the roller 51 in a downward direction. The roller 51 is rotated by the movement of the arm 50 over a contact plate 53 which is carried on a sector 54, of insulating material, pivoted to the base plate 49 at 55. The sector 54 is adapted to be rotated step-by-step by means of a finger lever 56 and is centered in any position of adjustment by means of a spring pawl 57 which engages any one of a plurality of notches 58 in the edge of the sector 54. By this adjustment of the sector the length of the path of contact between the roller 51 and the contact plate 53 can be varied. It will be observed that the positioning of the contact plate 53 with respect to the arc of movement of the roller 51 is such that the roller 51 traverses a greater or lesser amount of the contact plate according to the adjustment of the latter. The switch device described in this paragraph constitutes the time control switch.

In some cases it may be desirable to short circuit the time control switch so that the period of flow of welding current is governed by the treadle, that is to say the operator by maintaining the treadle depressed, can keep up a flow of welding current. For this purpose an extension 59 of the contact plate 53 is arranged to engage a fixed contact 60 when the sector 54 is adjusted to its extreme position in one direction. The extension 59 and the contact 60 short circuit the contact plate 53 and the roller 51. Thus, when the treadle is partially depressed and the contactors 45a and 45b engage the welding current will flow and will continue to flow until the treadle is completely depressed, thereby releasing the engagement of the movable arm 50 and the pawl 43. When this happens the circuit is broken by a pilot switch as hereinafter described.

The construction of the pilot switch is as follows: an arm 61 is fixed on a spindle 62 journalled in a block 63 mounted on the base plate 49. This arm 61 carries an arm 64 the extremity of which is provided with a holder 65 for a carbon contact element 66 which co-operates with a carbon contact element 67 fitted in a holder 68 secured to the base 49.

The main switch, timing switch, and pilot switch operate to give a timed flow of welding current in the following manner.

When the treadle 41 is depressed the yoke 32 moves forward, together with the upper electrode 16 and carries with it the pawl 43 which engages the block 46 and moves the arm 50 against the action of a torsional spring 69, and hence the brush roller 51 across the contact plate 53 and on to the insulation of the sector 54. This movement takes place before the contact 45a engages the contact 45b so that current does not flow in the welding circuit during the forward movement of the roller 51. Further movement of the yoke 32 then causes the contact 45a to engage and slide over the contact 45b, the pawl 43 turning against the action of the spring 44 on its pivot on the yoke 32 and disengaging itself from the block 46. The contact 45a slides over a considerable part of contact 45b before the pawl 43 releases the arm 50, thus ensuring that in spite of the treadle being released the main switch 45a, 45b, is closed at least long enough for the roller 51 to traverse the contact plate 53 and return to its initial position. The initial movement of the arm 50 moves a projection 70 thereon out of engagement with the short arm 61 of the pilot switch thereby allowing the carbon element 66 to fall into contact with the carbon element 67. The final movement of the yoke 32 causes the pawl 43 to release the arm 50 which in returning to its initial position traverses the contact plate 53 and during the time taken by the roller to traverse the contact plate, the welding current flows, the time switch, the main switch, and the pilot switch all being closed. Before the roller moves off the contact plate the projection 70 strikes the short arm 61 and the circuit is broken across the carbon contact elements 66, 67 of the pilot switch. It will be appreciated that as the return movement of the arm 50 and roller 51 is controlled entirely by the torsional spring 69 the time taken for the roller to traverse the contact plate will be substantially constant and independent of the treadle.

The electrical connections of the apparatus are shown diagrammatically in Figure 4 of the drawings. Electric current for the operation of the apparatus is provided by means of a power plug 71 mounted on the apparatus and adapted to cooperate with a supply plug 72. The power plug 71 includes a ground connection 73 by means of which the metal frame of the apparatus and the parts electrically connected thereto are grounded. The transformer 10 comprises a primary winding 74 and a secondary winding 75. The primary circuit of the transformer includes a main switch 76 which is connected by a connecting wire 77 to the contact plug 45b which co-operates with the contact 45a mounted on the catch 43. The contact 45a is connected by a flexible wire 78 with the pillar 48 which is connected, by the arm 50, with the roller 51 working over the contact plate 53 which is connected, by means of a wire 79, to the lever 61. The lever 61 is connected, by the arm 64, to the carbon contact element 66 which makes contact with the carbon contact element 67 connected by a wire 80 with one end of the primary winding 74 of the transformer. The primary winding 74 is tapped at various points and the tappings are connected to contact sockets 81 arranged radially around a centre contact socket 82 connected to the opposite pin of the power plug 71 to that connected to the switch 76. A plug 83 is adapted to be inserted in the socket 82 and any one of the sockets 81 whereby the amount of the primary winding operatively connected in the circuit can be varied and thereby the ratio between the primary and secondary windings of the transformer adjusted. The plug 83 includes a fuse 84 for protecting the apparatus against overloads. A pilot lamp 85 is connected in series with the switch 76 and the power plug 71 to indicate when the apparatus has been switched on. One end of the secondary winding of the transformer is connected to the frame 10 of the apparatus at 86 and the frame is connected to the upper electrode support 15 by the flexible connecting strap 28 which is electrically connected to the upper electrode 16. The other end of the secondary winding of the transformer is connected to the lower electrode by a connecting strap 88 the lower electrode being insulated electrically from the rest of the apparatus.

The operation of the machine above described is as follows:—

The work to be welded is held between one of the upper and one of the lower electrodes, the particular electrodes suitable for the work in hand being brought into the operative position by rotation of the turrets. The treadle mechanism is then operated and due to the connection of the inner member of the Bowden wire to the treadle, the said member is drawn out at the treadle end of the sheath, and the sheath extends itself to take up the free wire between the yoke 32 and the frame 10, thus pushing the yoke forward and compressing the springs 31 and permitting the spring 29 to press the electrodes towards each other and on to the work piece. This forward movement of the yoke 32 also causes the catch 45 to engage the block 46 and operate the timing switch as hereinbefore described. It will be seen therefore that it is only necessary to place the work-piece between the electrodes and press down on the treadle, whereupon the whole welding operation takes place, the making and breaking of the primary circuit of the transformer being effected automatically and the time the current is flowing in the primary circuit automatically controlled.

In carrying out a welding operation a chart can be consulted from which the particular transformer ratio, electrodes and setting of the time switch for the particular work in hand (e. g., gauge of wire being welded) can be ascertained.

Modifications may be made in the construction hereinbefore described without departing from the nature of the invention as herein ascertained. For example, the feed terminal may be eliminated and current fed direct to the switch arm. In this case an abutment for tripping the detent device will be sufficient.

I claim:

1. In an electric welding machine having a welding circuit including electrodes for connecting a work piece in the welding circuit, a welding-current-control switch means comprising a time switch including a contactor strip and a brush device, a reaction means, a trip catch, switch closing means, an operative connection between said trip catch and the switch closing means, said trip catch being arranged to engage said brush device and pre-set it to one side of the contactor strip against the action of the reaction means and subsequently to release said brush device so that on its return movement under the action of the reaction means it will traverse the contactor strip and close the welding circuit for a predetermined time, means for maintaining the welding circuit open during pre-setting of the brush device by the trip catch, a pilot switch having anti-sparking contacts, and an operative connection between said pilot switch and the time switch so arranged that the welding circuit is broken across the anti-sparking contacts of the pilot switch before the brush device has completed its return traverse across the contactor strip.

2. In an electric welding machine having a welding circuit including electrodes for connecting a work piece in the welding circuit, a welding-current-control switch means comprising a time switch including a contactor strip and a brush device, a reaction means, a trip catch, switch closing means, an operative connection between said trip catch and the switch closing means, said trip catch being arranged to engage said brush device and pre-set it to one side of the contactor strip against the action of the reaction means, and subsequently to release the said brush device so that on its return movement under the action of the reaction means it will traverse the contactor strip and close the welding circuit for a predetermined time, and a main switch in the welding circuit comprising a fixed contact, a movable contact, and an operative connection between said movable contact and the trip catch so arranged that the movable contact does not engage the fixed contact to close the welding circuit, until the trip catch has pre-set the brush device.

3. In an electric welding machine having a welding circuit including relatively movable electrodes between which a work piece to be welded is located, and manually operable means for controlling the movement of said electrodes, a welding-current-control switch means comprising a time switch including a contactor strip and a brush device arranged to traverse said contact strip, reaction means, a trip catch, a slidable yoke member, an operative connection between the yoke member and the relatively movable electrodes and between said yoke member and the manually operable means, a pivotal support on the yoke member for the trip catch so arranged that movement of the manually operable means in one direction to bring the electrodes into engagement with the work piece moves said trip catch into engagement with the brush device to pre-set it to one side of the contactor strip against the action of the reaction means and subsequently trips said catch to release the brush device so that on its return movement under the action of the reaction means, it will traverse the contactor strip and close the welding circuit for a predetermined time, and means for maintaining the welding circuit open during pre-setting of the brush device by the trip catch.

4. An electric welding machine as claimed in claim 3 and further comprising spring devices located between the yoke member and the relatively movable electrodes whereby the welding pressure is applied through said spring devices independently of the manually operated means.

5. In an electric welding machine having a welding circuit including relatively movable electrodes between which a work piece to be welded is located, and manually operable means for controlling the movement of said electrodes, a welding-current-control switch means comprising a time switch including a contactor plate, a brush device arranged to traverse said plate, a pivotal support for said brush device, a pivotal support for said contactor plate, means for adjusting said plate to vary the length of path traversed by the brush device, a yoke member, an operative connection between said yoke member and the manually operable means and between said yoke and the relatively movable electrodes, a trip catch, a pivotal support on said yoke member for the trip catch, spring means against the action of which the brush device is moved over and to one side of the contactor plate, by engagement of the trip catch therewith under the control of the manually operable means and subsequently released for movement in the reverse direction over the contactor plate to close the welding circuit for a predetermined time, a main switch comprising a stationary contact and a movable contact, an operative connection between said trip catch and said movable contact so arranged that the movable contact is not brought into engagement with the fixed contact to close the welding circuit until the trip catch has effected the initial movement of the brush device against the action of the spring means, and a pilot switch comprising a fixed carbon contact and a movable carbon contact, a pivoted member and a support on said pivoted member for the movable contact, said pivoted member being located in the path of movement of the brush device so that the initial movement of the brush device permits said carbon contacts to come into electrical engagement and a predetermined movement of the brush device in the reverse direction causes it to engage the pivoted member and break the welding circuit across said carbon contacts.

HAROLD GLADSTONE WATKIN.